(12) United States Patent
Halder et al.

(10) Patent No.: US 10,443,744 B2
(45) Date of Patent: Oct. 15, 2019

(54) CONTROL DEVICE FOR A FLUID WITH ASSEMBLY OPENING

(71) Applicant: BorgWarner Ludwigsburg GmbH, Ludwigsburg (DE)

(72) Inventors: Nicolai Halder, Stuttgart (DE); Markus Auer, Stuttgart (DE)

(73) Assignee: BORGWARNER ESSLINGEN GMBH, Oberboihingen (DE)

( * ) Notice: Subject to any disclaimer, the term of this patent is extended or adjusted under 35 U.S.C. 154(b) by 0 days.

(21) Appl. No.: 15/895,258

(22) Filed: Feb. 13, 2018

(65) Prior Publication Data
US 2018/0238457 A1 Aug. 23, 2018

(30) Foreign Application Priority Data

Feb. 17, 2017 (DE) .......... 10 2017 103 273
Aug. 30, 2017 (DE) .......... 10 2017 119 921

(51) Int. Cl.
*F16K 5/04* (2006.01)
*F01P 7/14* (2006.01)
*F16K 27/06* (2006.01)

(52) U.S. Cl.
CPC ............ *F16K 5/0464* (2013.01); *F01P 7/14* (2013.01); *F16K 5/0471* (2013.01); *F16K 5/0492* (2013.01); *F16K 27/065* (2013.01); *F01P 2007/146* (2013.01); *Y10T 137/86871* (2015.04)

(58) Field of Classification Search
CPC .... F16K 5/0464; F16K 5/0492; F16K 27/065; F16K 5/0471; F01P 7/14; F01P 2007/146; Y10T 137/86871

USPC ........ 251/309–312, 315.14, 317; 137/625.47
See application file for complete search history.

(56) References Cited

U.S. PATENT DOCUMENTS

| | | | | |
|---|---|---|---|---|
| 676,526 A * | 6/1901 | Anderson | ............... | B05B 1/262 251/315.14 |
| 2,734,715 A * | 2/1956 | Knox | ...................... | F16K 5/201 251/315.14 |
| 2,788,016 A * | 4/1957 | Scherer | ................... | F16K 5/227 251/315.14 |
| 3,016,062 A * | 1/1962 | Zinniger | ............... | F16K 5/0668 251/317 |
| 3,100,499 A * | 8/1963 | Bass | ...................... | F16K 5/0668 251/315.14 |
| 4,177,832 A * | 12/1979 | Price | ..................... | F16K 5/0689 251/315.14 |
| 4,936,548 A * | 6/1990 | Heinemann | ............ | B65G 53/52 251/316 |
| 2003/0005966 A1* | 1/2003 | Johann | ................... | F16K 11/076 137/625.47 |
| 2003/0098077 A1* | 5/2003 | McLane | ............. | B60H 1/00485 137/625.47 |
| 2013/0221116 A1* | 8/2013 | Tsuchiya | ................... | F01P 7/14 236/34.5 |

(Continued)

*Primary Examiner* — John Bastianelli
(74) *Attorney, Agent, or Firm* — Bose McKinney & Evans LLP

(57) ABSTRACT

A control device for a fluid is described, having a housing, a first opening, a second opening, a channel running from the first to the second opening and a movable control element, which is pivotable between a closed position and an open position. The first opening of the control device forms an assembly opening, through which the control element can be installed in the housing.

18 Claims, 7 Drawing Sheets

(56) References Cited

U.S. PATENT DOCUMENTS

| | | | |
|---|---|---|---|
| 2014/0190427 A1* | 7/2014 | Nagahama | F01P 7/16 123/41.1 |
| 2015/0075452 A1* | 3/2015 | Oikawa | F01P 7/14 251/314 |
| 2015/0075658 A1* | 3/2015 | Tsuchiya | F16K 5/04 251/309 |
| 2015/0122359 A1* | 5/2015 | Tsuchiya | F01P 7/16 137/625.47 |

* cited by examiner

CONTROL DEVICE FOR A FLUID WITH ASSEMBLY OPENING

RELATED APPLICATIONS

This application claims priority to DE 10 2017 103 273.8, filed Feb. 17, 2017, and also claims priority to DE 10 2017 119 921.7, filed Aug. 30, 2017, both of which are hereby incorporated herein by reference in their entirety.

BACKGROUND

This disclosure relates to a control device for a fluid, in particular a control valve having a housing and a movable control element. In particular, the control device is suitable for controlling a coolant flow in a cooling circuit of an internal combustion engine.

In known internal combustion engines with a cooling circuit and an internal combustion engine housing, for example, an engine block which contains a coolant channel, control devices for a coolant flow are usually used in the cooling circuit which have a multi-part housing which surrounds a rotary slide and which must be taken apart or opened for assembly or disassembly of the rotary slide.

SUMMARY

This disclosure teaches an improved control device and a simplified assembly.

A control device according to this disclosure for a fluid, in particular a coolant in a cooling circuit of an internal combustion engine, comprises a housing having a first opening, a second opening and a channel running from the first to the second opening, and a movable control element. The control element is pivotable between a closed position and an open position and is used for changing the flow-through channel cross-section. In particular, the control element can be a rotary slide which can be pivoted about an axis of rotation. The first opening forms an assembly opening, through which the control element can be installed in the housing. One of the two openings is an inlet opening, the other opening is an outlet opening. In particular, the assembly opening may be the inlet opening. A flow from the inlet opening to the outlet opening is possible in the open position of the control element. The control element blocks the flow between the first and the second opening in the closed position. The shape and size of the first opening is designed such that an assembly of the control element through this opening is easily possible.

This disclosure teaches the following advantages:

The first opening in the housing of the control device, which in operation serves as an inlet or outlet opening, is at the same time the assembly opening through which the control element is installed in the housing. The first opening thus fulfills a dual function. The assembly opening is used for the flow-through of the control device and is not closed. Rather, the channel of the control device is continued via the assembly opening after assembly on a connecting part, for example, an internal combustion engine housing, through a channel arranged therein.

The design and manufacture of the housing of the control device is simplified by the open construction in the direction of the assembly opening or of the connecting part. A section of the housing surrounding the control element, in particular, the entire housing, can be produced in one piece, for example, as an injection-molded part. The accuracy of size and form of the housing in the region surrounding the control element can thereby be increased. A leakage current in the closed position can be minimized without a sealing arrangement between the control element and the housing. If a sealing arrangement is provided between the control element and the housing, it has to be able to compensate for fewer tolerances.

A separate assembly opening, which would have to be closed after installation with a cover, or multiple parts of the housing in the region of the control element for assembly purposes can thus be omitted. The production and assembly is greatly simplified.

The control device is very compact. At the same time, the design according to this disclosure allows relatively large free flow cross-sections of the channel and the control element in the open position with little overall space. The fluid flow experiences only a few deflections, so that the arrangement according to this disclosure is streamlined. The control device causes only a small pressure drop in the fluid flow in the open position.

The necessary construction space and space requirement for the control device is reduced.

In a further embodiment of this disclosure, the free cross-section of a channel section adjoining the first opening can be larger than the free cross-section of a channel section between the control element and the second opening. The first opening may be larger than the second opening. The channel may be curved or angled between the first and second openings. The channel section adjoining the first opening may run obliquely or transversely to a channel section adjoining the second opening. The control element can be arranged in the housing in such a way that it projects out of the housing in at least one position with a section through the assembly opening, that is, through the first opening. Due to the fact that a section of the control element projects out of the housing through the assembly opening at least in one of its positions, this section simultaneously projects into the connecting part in the assembled state. The housing of the control device thus does not completely surround the control element. The control element is completely surrounded by housing parts only when the control device is assembled on the connecting part. The housing of the control device can thereby be reduced in size.

Both the housing and the control element can each have a sealing surface. An annular sealing arrangement can sit between the sealing surface of the housing and the sealing surface of the control element. The annular sealing arrangement can have a flow-through passage and a circumferential direction surrounding the passage. The passage of the sealing arrangement can be flowed through in the open position of the control element. The control element is pivotable about the axis of rotation along its sealing surface relative to the sealing arrangement between the closed position and the open position. The sealing arrangement may project from the housing. The sealing arrangement may have a support surface, which is designed to support on a connecting part continuing the channel. As a result, the sealing arrangement, in particular when it projects from the housing, can be prevented from rotating about the axis of rotation of the control element.

The sealing arrangement may include a sealing frame and a sealing ring in contact therewith impermeable to fluids. At least in the closed position of the control element, the sealing frame can rest sealingly against its sealing surface with its side facing the control element. The sealing ring may consist of a rubber-elastic material, for example an ethylene-propylene-diene rubber (EPDM). The sealing ring can rest on its side facing away from the sealing frame sealingly against the sealing surface of the housing. The sealing ring can press the sealing frame resiliently against the sealing surface of the control element, in particular at least when the control element is in the closed position. In particular, the sealing surface of the housing may be planar. The sealing surface of the control element may be rotationally symmetrical about the axis of rotation, and may in particular have the shape of a section of a circumferential surface of a circular cylinder or a sphere. The sealing arrangement may be oval in its circumferential direction. The passage of the sealing arrangement may have the shape of a slotted hole. A section of the sealing ring resting against the sealing surface of the housing may be configured in the form of a sealing lip.

In a further embodiment, the housing may include a contact surface which is associated with the first opening and designed for contact on a connecting part continuing the channel. The contact surface may surround the first opening, in particular completely surround. The control device may have a seal surrounding the first opening. The seal can run along the contact surface. The contact surface may include a sealing groove surrounding the first opening. A simple assembly of the control device to the connecting part may be ensured through the contact surface. The control device according to this disclosure can thus, like previous control devices, be manufactured by a supplier and completely pre-assembled. Subsequently, it can be supplied to the manufacturer of the connecting part, for example, the internal combustion engine manufacturer, and simply attached by the latter, for example, to an internal combustion engine housing. The channel section 84 between the control element and the second opening can run along, in particular parallel to, the contact surface, e.g., contact plane 33.

In a further embodiment, the contact surface and/or the sealing surface of the housing may be planar. A contact plane which runs along the planar contact surface can be defined. A sealing plane which extends along the planar sealing surface of the housing can be defined. The planar contact surface is in particular coplanar to the contact plane. The planar sealing surface lies in particular coplanar with the sealing plane. The contact plane and the sealing plane can intersect. The control element can project beyond the contact surface in at least one of its positions and is then intersected by the contact plane. The contact plane can intersect the sealing arrangement and/or the sealing surface of the housing. As a result, the sealing arrangement and/or the sealing surface of the housing lies on both sides of the contact plane. The sealing arrangement may thus be partially arranged in the housing of the control device and partially in the connecting part when the control device is assembled thereto. The housing may have an extension protruding into the connecting part, on which a part of the sealing surface is arranged. As a result, the free flow cross-section in the passage of the sealing arrangement can be increased and the flow losses can thus be reduced.

One side of the contact plane may face the axis of rotation of the control element. One side of the sealing plane may face the axis of rotation of the control element. The angle between the side of the contact plane facing the axis of rotation and the side of the sealing plane facing the axis of rotation may be less than 90°. The angle can be 45° to 88°, in particular 70° to 85°. This can simplify the manufacture of the housing of the control device and the assembly of the sealing arrangement and control element. The section of the channel in the housing of the control device opening out through the sealing surface into the passage of the sealing arrangement may run at a right angle to the sealing surface or parallel to the contact plane.

The control device according to this disclosure is adapted to be used as a coolant valve of an internal combustion engine, in particular coolant switching valve. The internal combustion engine may include a cooling circuit for cooling the internal combustion engine, an internal combustion engine housing and a control device for a coolant flow in the cooling circuit. The internal combustion engine housing may be, for example, an engine block, a cylinder crankcase or a cylinder head. The internal combustion engine housing may include a coolant channel that is part of the cooling circuit. The housing of the control device can be attached or is attached to the internal combustion engine housing. The channel in the housing of the control device can continue the coolant channel of the internal combustion engine housing. The contact surface or the contact plane can form a parting plane between the housing of the control device and the internal combustion engine housing. The housing of the control device may include a second contact surface, which is also designed to contact the internal combustion engine and is associated with the second opening. The second contact surface may surround the second opening. The first contact surface and the second contact surface can be coplanar and lie in the contact plane. This can simplify the interface between the control device and the internal combustion engine as well as the assembly of the control device.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

Figure 1:
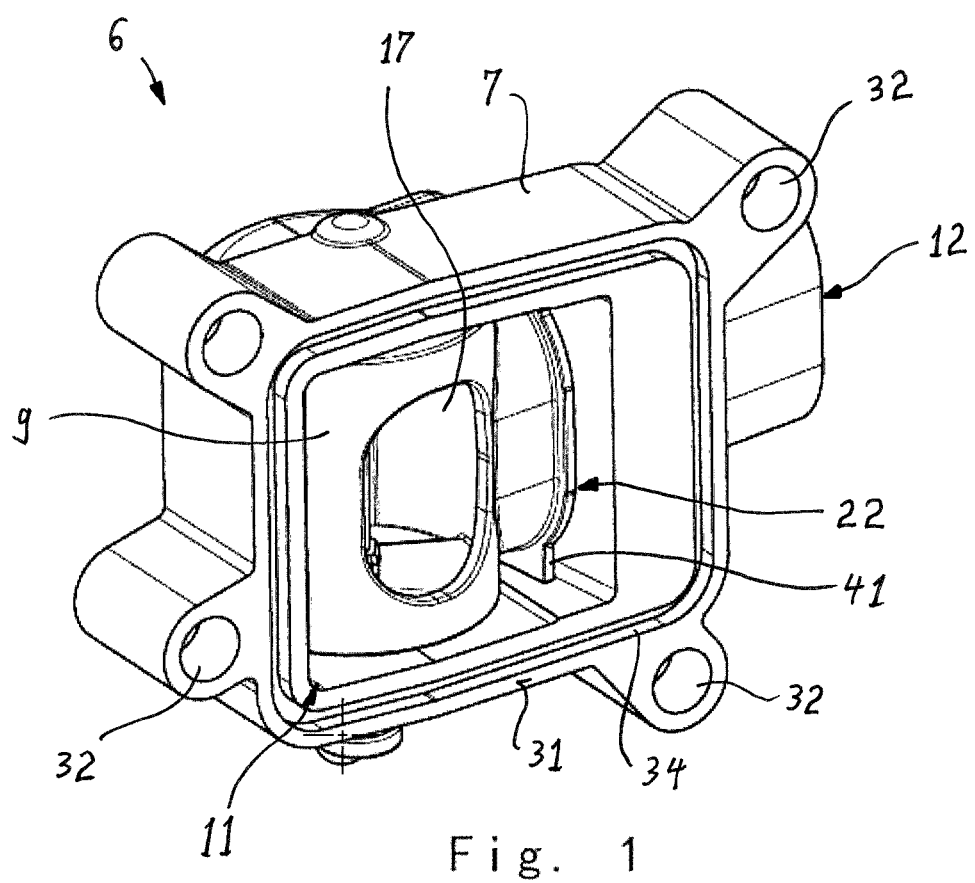
FIG. 1 shows a perspective view of a first embodiment of a control device according to this disclosure with a housing and a control element completely arranged therein.

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

A control device 6 is shown in each case in the figures. The control device 6 has a housing 7, which can be attached to a connecting part, not shown, namely a cylinder crankcase of an internal combustion engine. The housing 7 includes a channel 8 which can continue a coolant channel of the cylinder crankcase, not shown. The channel 8 has a plurality of sections 81, 82 and 83. The control device 6 includes a movable control element 9 for changing the flow-through channel cross-section of the channel 8 in order to control the coolant flow in a cooling circuit of the internal combustion engine. The housing 7 has a first opening 11, via which coolant can enter the section 81 of the channel 8 and can flow through the control device 6. The housing 7 has a second opening 12 from which the coolant can leave again from the control device 6.

The control element 9 has a sealing surface 13 which has the shape of a section of a lateral surface of a circular cylinder. The control element 9 is rotatably mounted in a manner not shown and is pivotable about an axis of rotation 14. The control element 9 is non-rotatably connected to a shaft 15, the end 16 of which is led out of the housing 7 and is coupled in a manner not shown to a drive for rotating the control element 9. The control element 9 is pivotable about the axis of rotation 14 in the counterclockwise direction from its position shown in FIGS. 3 and 6 into an open position. The cylindrical wall of the control element 9 and the sealing surface 13 arranged thereon contain a passage opening 17, which connects the sections 81 and 82 of the channel 8 to one another in the open position shown in FIG. 9.

The housing 7 has a planar sealing surface 20, which lies in a sealing plane 21. Between the sealing surface 20 and the sealing surface 13 sits an annular sealing arrangement 22, which includes a sealing frame 23 and a sealing ring 24 and has a passage 25. The sealing ring 24 is connected to the sealing frame 23 impermeable to fluids. Sealing ring 24 and sealing frame 23 may form a pre-assembled module, wherein sealing ring 24 and sealing frame 23 are connected with each other before insertion into the housing 7, in particular, in a manually detachable manner. The sealing ring 24 rests sealingly against the sealing surface 20 and consists of a rubber-elastic material. The sealing ring 24 presses the sealing frame 23 sealingly against the sealing surface 13 of the control element 9. In the open position of the control element 9 shown in FIG. 9, the channel section 82, the passage 25 and the passage opening 17 are aligned with one another, so that a very low flow resistance is provided for the coolant flowing through the channel 8. If the control element 9 is rotated about the axis of rotation 14 in a clockwise direction into its closed position, see FIGS. 3 and 6, then the wall of the control element 9 with the sealing surface 13 completely closes the passage 25. As a result, the coolant flow from the channel section 81 into the channel section 82 can be shut off.

The housing 7 includes a contact surface 31 associated with the first opening 11, with which contact surface the housing 7 may rest against the connecting part, not shown. The housing 7 is designed flange-like in the region of the contact surface 31 and has fastening holes 32 for fastening to the connecting part. The contact surface 31 lies in a contact plane 33 and surrounds the first opening 11. A sealing groove 34, which completely surrounds the first opening 11, runs along the contact surface 31.

Figure 7:
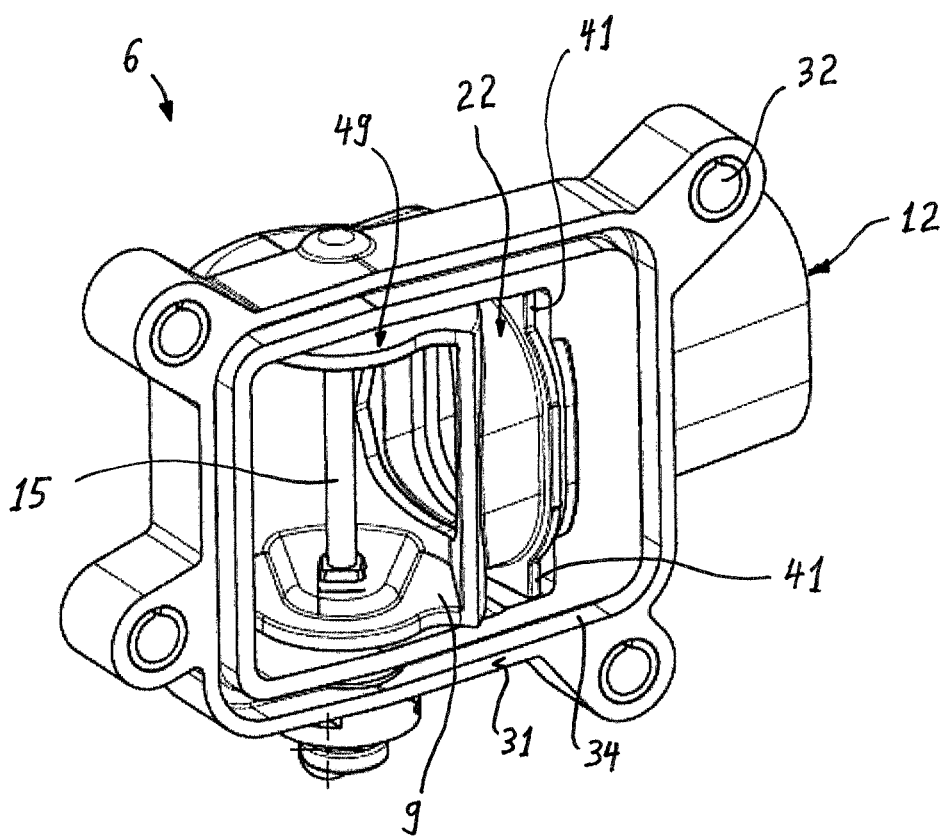
FIGS. 7 to 9 show views corresponding to FIGS. 4 to 6 of the second embodiment, wherein the control element is shown in its open position.
Figure 8:
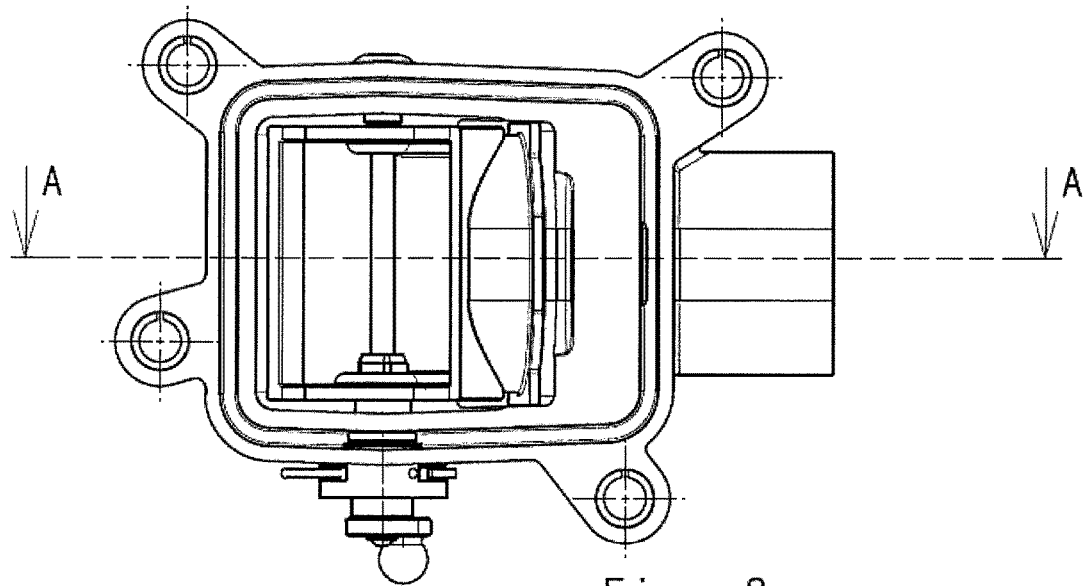

The first opening 11 is dimensioned such that it forms an assembly opening, through which the control element 9 and the sealing arrangement 22 can be installed in the housing 7. The sealing arrangement 22 has two support surfaces 41 designed to support on the connecting part, not shown. The support surfaces 41 may lie in the contact plane 33, see, for example, FIG. 7, or at a distance to the contact plane 33 within the housing 7, see FIG. 1. The support surfaces 41 prevent the sealing arrangement 22 from being taken clockwise with a rotation of the control element. The sealing arrangement 22 has at least one support surface 42 facing away from the support surfaces 41, with which it is supported on the housing 7.

Figure 3:
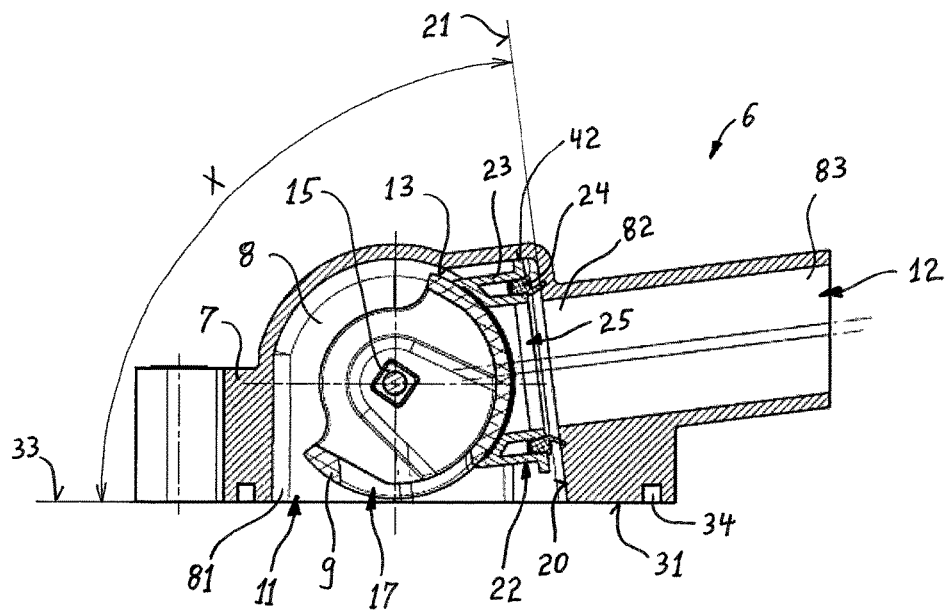
FIG. 3 shows a sectional view along the line A-A of FIG. 2.
Figure 4:
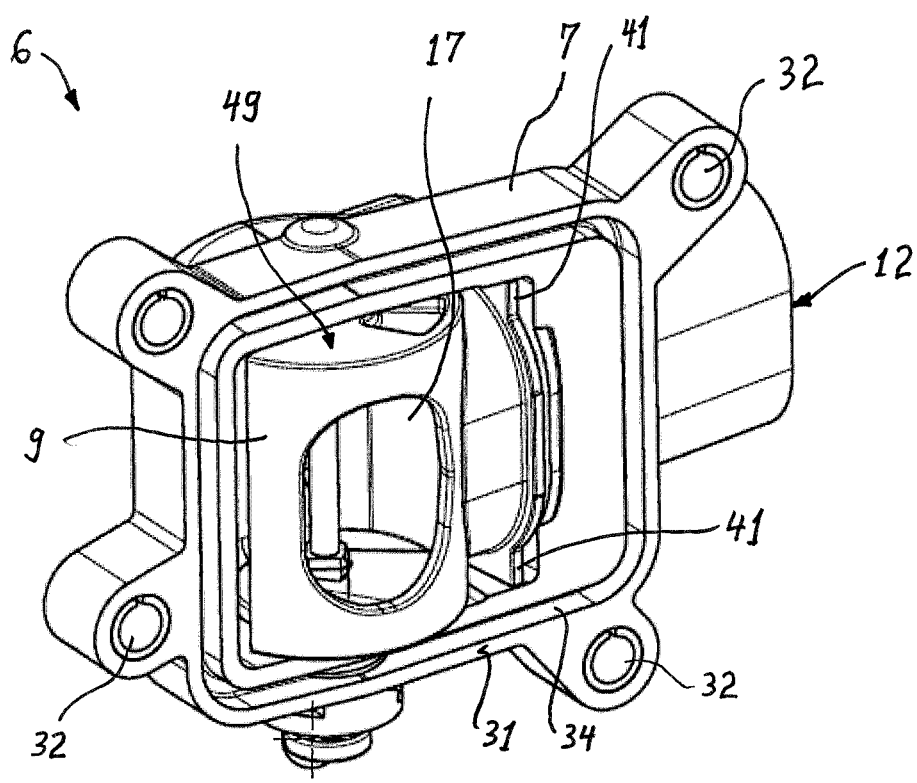
FIG. 4 shows a view similar to FIG. 1 of a second exemplary embodiment, wherein the control element projects partially out of the housing and is shown in its closed position.
Figure 5:
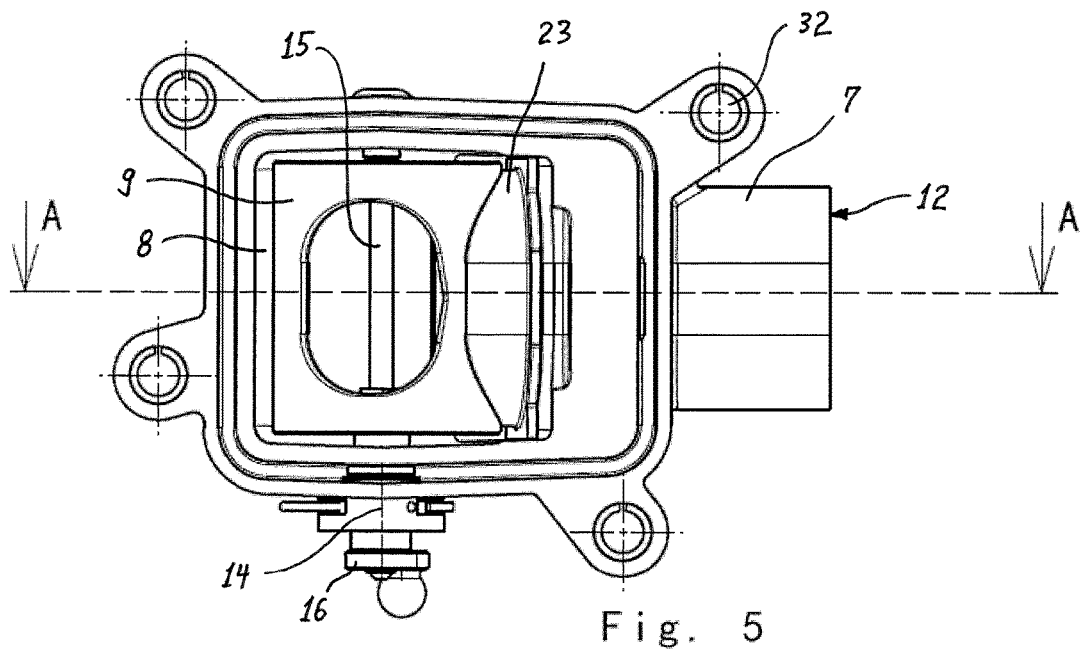
FIG. 5 shows a view similar to FIG. 2 of the embodiment of FIG. 4.
Figure 6:
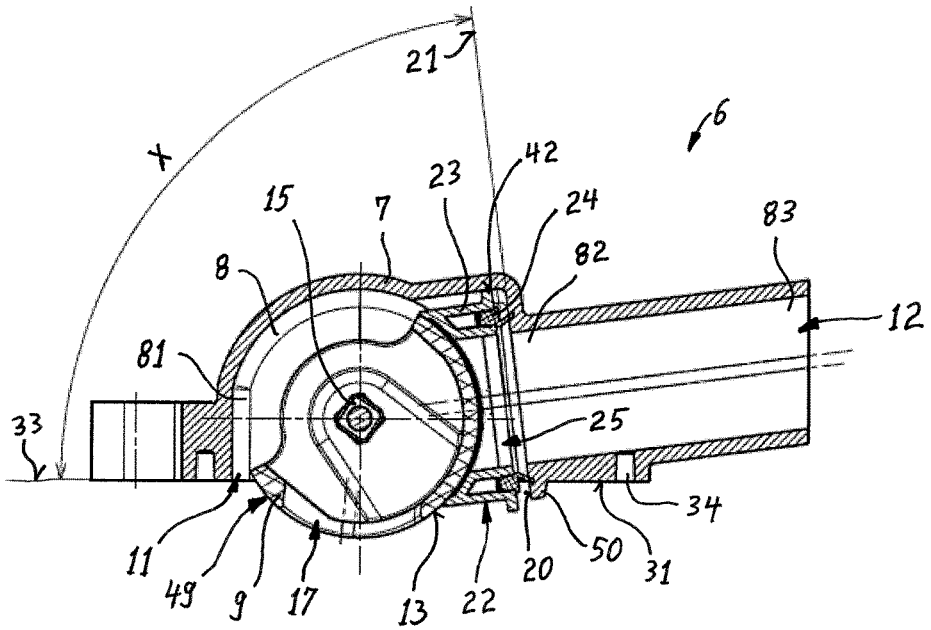
FIG. 6 shows a view similar to FIG. 3 of the embodiment of FIG. 4.
Figure 9:
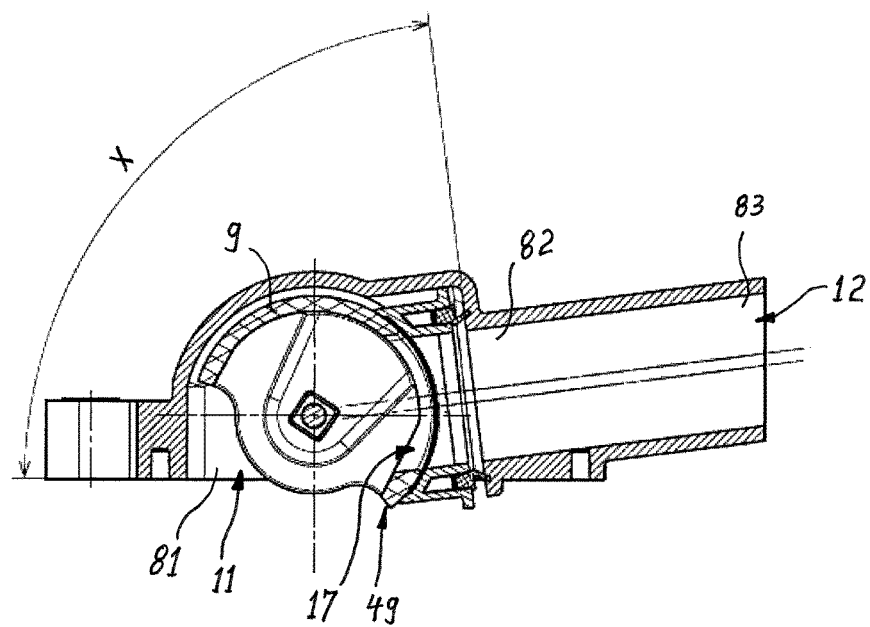
Figure 10:
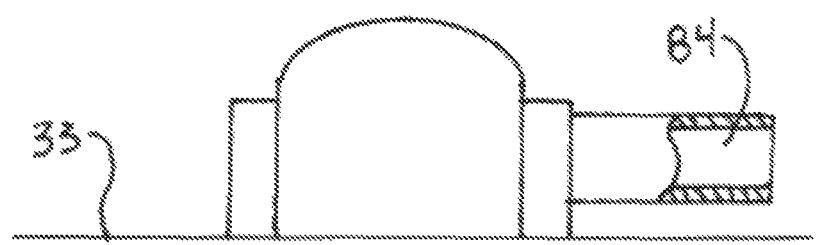
FIG. 10 is a schematic, partially cutaway, side view of another embodiment of the control device.

The contact plane 33 intersects the sealing plane 21. In each case, one side of the contact surface 33 and of the sealing plane 21 faces the axis of rotation 14 of the control element. The angle X between the side of the contact plane 33 facing the axis of rotation 14 and the side of the sealing plane 21 facing the axis of rotation 14, see FIGS. 3, 6 and 9, is about 80°. The channel section 82 adjoining the sealing surface 20 on the side of the sealing plane 21 facing away from the sealing arrangement 22, can, as seen in FIGS. 3, 6 and 9, run approximately perpendicular to the sealing plane 21 and then run obliquely to the contact plane 33. The channel section 82 goes straight into the channel section 83 adjoining the second opening 12. Alternatively, in a modification not shown, the channel sections 82, 83 run approximately parallel to the contact plane 33. They can also be oriented obliquely to one another such that only one of the channel sections 82 or 83 runs approximately parallel to the contact plane 33. The housing 7 is configured in one piece as an injection-molded part in the region surrounding the control element 9 and the sealing arrangement 22, that is, in the region containing the channel sections 81, 82 and 83.

Figure 2:
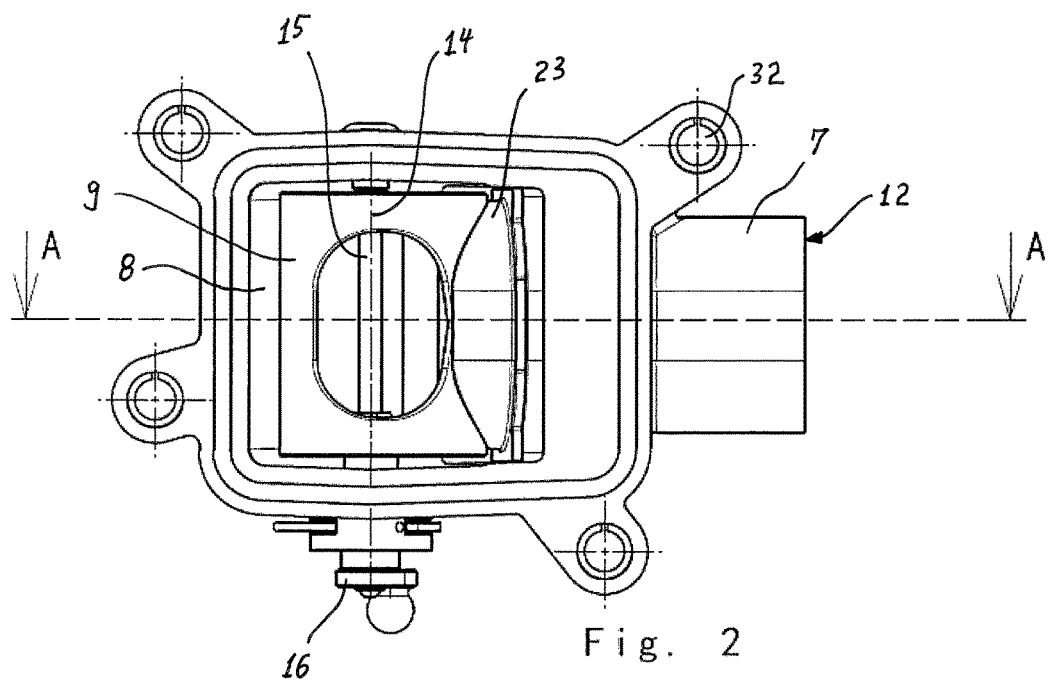
FIG. 2 shows a plan view of the control device of FIG. 1.

In the first exemplary embodiment, see FIGS. 1 to 3, the channel section 81 adjoining the first opening 11 is designed such that the control element 9 is located completely within the housing 7. Also, the sealing surface 20 and the sealing arrangement 22 are completely arranged in the housing 7 in the first embodiment.

In the second exemplary embodiment, see FIGS. 4 to 9, the control element 9 is arranged in the first channel section 81 such that it projects from the housing 7 with a section 49 through the assembly opening 11. There, during operation, the control element 9 is thus partially arranged in the housing 7 and partially in the connecting part, not shown. In the second embodiment, the housing 7 has an extension 50, which projects out of the contact plane 33. A part of the sealing surface 20 is located on the side of the contact plane 33 facing the axis of rotation 14. Another part of the sealing surface 20 is arranged on the extension 50 and is located on the side facing away from the axis of rotation of the contact plane 33. The contact plane 33 thus intersects the sealing surface 20.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

LIST OF REFERENCE NUMBERS

| | |
|---|---|
| 6 | Control device |
| 7 | Housing |
| 8 | Channel |
| 9 | Control element |
| 11 | First opening |
| 12 | Second opening |

-continued

| | |
|---|---|
| 13 | Sealing surface |
| 14 | Axis of rotation |
| 15 | Shaft |
| 16 | End |
| 17 | Passage opening |
| 20 | Planar sealing surface |
| 21 | Sealing plane |
| 22 | Annular sealing arrangement |
| 23 | Sealing frame |
| 24 | Sealing ring |
| 25 | Passage |
| 31 | Contact surface |
| 32 | Fastening holes |
| 33 | Contact plane |
| 34 | Sealing groove |
| 41 | Support surface |
| 42 | Support surface |
| 49 | Section |
| 50 | Extension |
| 81 | Channel section |
| 82 | Channel section |
| 83 | Channel section |
| X | Angle |

What is claimed is:

1. A control device for a fluid, comprising:
a housing having a first opening, a second opening and a channel extending from the first opening to the second opening;
a movable control element, which is pivotable between a closed position and an open position, wherein the first opening forms an assembly opening through which the control element is configured to be installed in the housing; and
an annular sealing arrangement sits between a sealing surface of the housing and a sealing surface of the control element and provides a liquid impermeable seal between the control element and the second opening, wherein the annular sealing arrangement includes a sealing frame and a sealing ring, the sealing frame and the sealing ring being manually detachably secured together in a pre-assembled module that is configured to be installed through the first opening in the housing, the sealing frame engaging the control member and the sealing ring being an elastic member that engages the housing wherein the sealing ring resiliently biases the sealing frame against the control member.

2. The control device according to claim 1, in which a free cross-section of a channel section adjoining the first opening is larger than that of a channel section between the control element and the second opening.

3. The control device according to claim 1, in which the first opening is larger than the second opening.

4. The control device according to claim 1, in which the channel between the first opening and the second opening is curved or angled.

5. The control device according to claim 1, in which the control device is adapted for controlling a coolant flow in a cooling circuit of an internal combustion engine.

6. The control device according to claim 1, in which the housing has a contact surface associated with the first opening and configured to contact a connecting part configured to communicate with the first opening.

7. The control device according to claim 6, in which the contact surface surrounds the first opening.

8. The control device according to claim 6, in which the channel defined by the housing includes a section between the control element and the second opening that runs parallel to the contact surface.

9. The control device according to claim 1 wherein the sealing frame includes a first support surface engageable with a connecting part, the connecting part being securable to the housing in a position wherein the connecting part is in communication with the first opening in the housing, the sealing frame further including a second support surface engaged with the housing wherein the first and second support surfaces face in opposite directions and wherein respective engagement of the first and second support surfaces with the connecting part and the housing prevent rotation of the sealing frame relative to the housing.

10. The control device according to claim 1 wherein the sealing frame defines a groove in which the sealing ring is detachably secured.

11. A control device for a fluid, comprising:
a one-piece housing having a first opening, a second opening and a channel extending from the first opening to the second opening;
a movable control element, which is pivotable between a closed position and an open position, wherein the first opening forms an assembly opening through which the control element is configured to be installed in the housing;
wherein the control device is adapted for controlling a coolant flow in a cooling circuit of an internal combustion engine and wherein the one-piece housing includes an attachment flange, the attachment flange defining at least one bolt hole and a contact surface surrounding the first opening, the attachment flange being adapted to be bolted to a cylinder crankcase of the internal combustion engine with the contact surface engaging the cylinder crankcase; and
wherein the control element, at least in one position, partially projects out of the housing through the assembly opening.

12. The control device according to claim 11, in which an annular sealing arrangement sits between a sealing surface of the housing and a sealing surface of the control element, wherein the annular sealing arrangement is configured to be installed through the first opening in the housing.

13. The control device according to claim 12, in which the sealing arrangement has at least one supporting surface which is configured to engage a connecting part configured to communicate with the first opening.

14. The control device according to claim 12, in which the contact surface and/or the sealing surface of the housing is planar.

15. The control device according to claim 14, in which a contact plane runs along the planar contact surface and a sealing plane runs along the planar sealing surface of the housing, wherein the contact plane and the sealing plane intersect.

16. The control device according to claim 15, in which in each case a side of the contact plane and a side of the sealing plane faces an axis of rotation of the control element, wherein the angle between the side of the contact plane facing the axis of rotation and the side of the sealing plane facing the axis of rotation is smaller than 90°.

17. The control device according to claim 11 wherein the contact surface defined by the attachment flange defines a sealing groove which surrounds the first opening.

18. A control device for a fluid, comprising:
a housing having a first opening, a second opening and a channel extending from the first opening to the second opening;
a movable control element, which is pivotable between a closed position and an open position, wherein the first opening forms an assembly opening through which the control element is configured to be installed in the housing;

an annular sealing arrangement sits between a planar sealing surface of the housing and a sealing surface of the control element, wherein the annular sealing arrangement is configured to be installed through the first opening in the housing; and wherein the housing defines a planar contact surface associated with the first opening and configured to contact a connecting part, the connecting part being configured to communicate with the first opening, and wherein a contact plane runs along the planar contact surface and a sealing plane runs along the planar sealing surface of the housing, wherein the contact plane and the sealing plane intersect, and wherein the contact plane intersects the sealing arrangement and/or the sealing surface of the housing.

* * * * *